(12) United States Patent
Contreras et al.

(10) Patent No.: US 8,824,077 B2
(45) Date of Patent: Sep. 2, 2014

(54) PERPENDICULAR MAGNETIC RECORDING WRITE HEAD WITH LADDER NETWORK COMPENSATION CIRCUITRY ON SLIDER BODY FOR WRITE CURRENT OVERSHOOT AT WRITE CURRENT SWITCHING

(75) Inventors: John Thomas Contreras, Palo Alto, CA (US); Samir Y. Garzon, Sunnyvale, CA (US); David John Seagle, Morgan Hill, CA (US)

(73) Assignee: HGST Netherlands B.V., Amsterdam (NL)

( * ) Notice: Subject to any disclaimer, the term of this patent is extended or adjusted under 35 U.S.C. 154(b) by 517 days.

(21) Appl. No.: 13/306,552

(22) Filed: Nov. 29, 2011

(65) Prior Publication Data

US 2013/0135765 A1    May 30, 2013

(51) Int. Cl.
*G11B 5/09* (2006.01)
(52) U.S. Cl.
USPC .......... 360/46; 360/68; 360/234.3; 360/234.4
(58) Field of Classification Search
USPC ............. 360/46, 68, 234.3, 234.4; 369/13.22, 369/13.23, 44.12, 44.14; 720/685
See application file for complete search history.

(56) References Cited

U.S. PATENT DOCUMENTS

| 4,882,639 | A   | * | 11/1989 | Nasu et al. ...................... 360/65 |
| 5,717,547 | A   |   | 2/1998  | Young |
| 6,331,919 | B1  |   | 12/2001 | Klaassen et al. |
| 6,349,009 | B1  | * | 2/2002  | Dakroub et al. ................ 360/68 |
| 6,603,623 | B1  |   | 8/2003  | Fontana, Jr. et al. |
| 7,545,608 | B2  |   | 6/2009  | Araki et al. |
| 8,531,800 | B1  | * | 9/2013  | Contreras et al. ............. 360/246 |
| 2011/0109993 | A1 | * | 5/2011 | Contreras et al. .......... 360/123.1 |

FOREIGN PATENT DOCUMENTS

| JP | 2002084157 A | 3/2002 |
| JP | 2010135602 A | 6/2010 |

* cited by examiner

*Primary Examiner* — Wayne Young
*Assistant Examiner* — Carlos E Garcia
(74) *Attorney, Agent, or Firm* — Thomas R. Berthold (57) ABSTRACT

Write enhancement circuitry on the head carrier of a magnetic recording disk drive provides additional write current overshoot beyond that provided by the write driver circuitry. The write enhancement circuitry is formed on the head carrier as ladder network blocks. A first ladder network block is a first capacitor C1 located in parallel with the write coil. The second ladder network block includes a second capacitor C2 having substantially the same inductance L2. The compensation circuitry is referred to as a ladder network because additional ladder blocks, like the second block but with different values of capacitance and inductance, may be located on the head carrier.

16 Claims, 9 Drawing Sheets

PERPENDICULAR MAGNETIC RECORDING WRITE HEAD WITH LADDER NETWORK COMPENSATION CIRCUITRY ON SLIDER BODY FOR WRITE CURRENT OVERSHOOT AT WRITE CURRENT SWITCHING

BACKGROUND OF THE INVENTION

1. Field of the Invention

This invention relates generally to perpendicular magnetic recording systems, and more particularly to a system with fast switching of the magnetization direction of the perpendicular write head.

2. Description of the Related Art

Perpendicular magnetic recording, wherein the recorded bits are stored in a perpendicular or out-of-plane orientation in the recording layer, allows for ultra-high recording densities in magnetic recording hard disk drives. The write head must be able to write data not only at high bit-density but also at high data-rates. The write speed is particularly important in enterprise disk drives. However, the switching time for the write pole of the write head to switch from one magnetization direction to the other is a limiting factor as the data rate is increased. At high data-rates, the available magnetic flux from the write head, as seen by the recording layer on the disk, is limited by the low-frequency flux output of the write head. The reason for such loss of write flux includes a slow intrinsic time-constant of the magnetization reversal in the main pole of the write head.

It is known that additional overshoot of the write current from the disk drive's write driver circuitry can aid in the magnetization reversal speed. Write enhancement circuitry that provides additional overshoot beyond that provided by the write driver circuitry aids in overcoming signal transmission losses and reduces the required overshoot from the write driver. A faster reversal time with a lower write driver overshoot requirement significantly reduces the power of the overall front-end write system, i.e., the write driver, the interconnect between the write driver and the write head, and the write head.

What is needed is write enhancement circuitry separate from the write driver that provides additional overshoot of the write current and that can be fabricated on the head carrier.

SUMMARY OF THE INVENTION

The invention relates to write enhancement circuitry on the head carrier of a magnetic recording disk drive that provides additional write current overshoot beyond that provided by the write driver circuitry. The write enhancement circuitry is formed on the head carrier as ladder network blocks. A first ladder network block is a first capacitor C1 located in parallel with the write coil. The second ladder network block includes a second capacitor C2 having substantially the same inductance L2. The compensation circuitry is referred to as a ladder network because additional ladder blocks, like the second block but with different values of capacitance and inductance, may be located on the head carrier.

The second ladder network block may be formed on the head carrier as two spaced-apart lower coil sections and two spaced-apart upper coil sections, with the upper and lower coil sections being separated by a dielectric gap layer. Each L2 inductor is made up of an upper coil section on one side and a lower coil section on the opposite side that are connected by vias through the gap layer. The capacitor C2 is formed as the upper and lower coil sections as the metal capacitor plates separated by the dielectric gap layer and thus the capacitance for C2 is distributed across each of the two L2 inductors.

For a fuller understanding of the nature and advantages of the present invention, reference should be made to the following detailed description taken together with the accompanying figures.

DETAILED DESCRIPTION OF THE INVENTION

Figure 1:
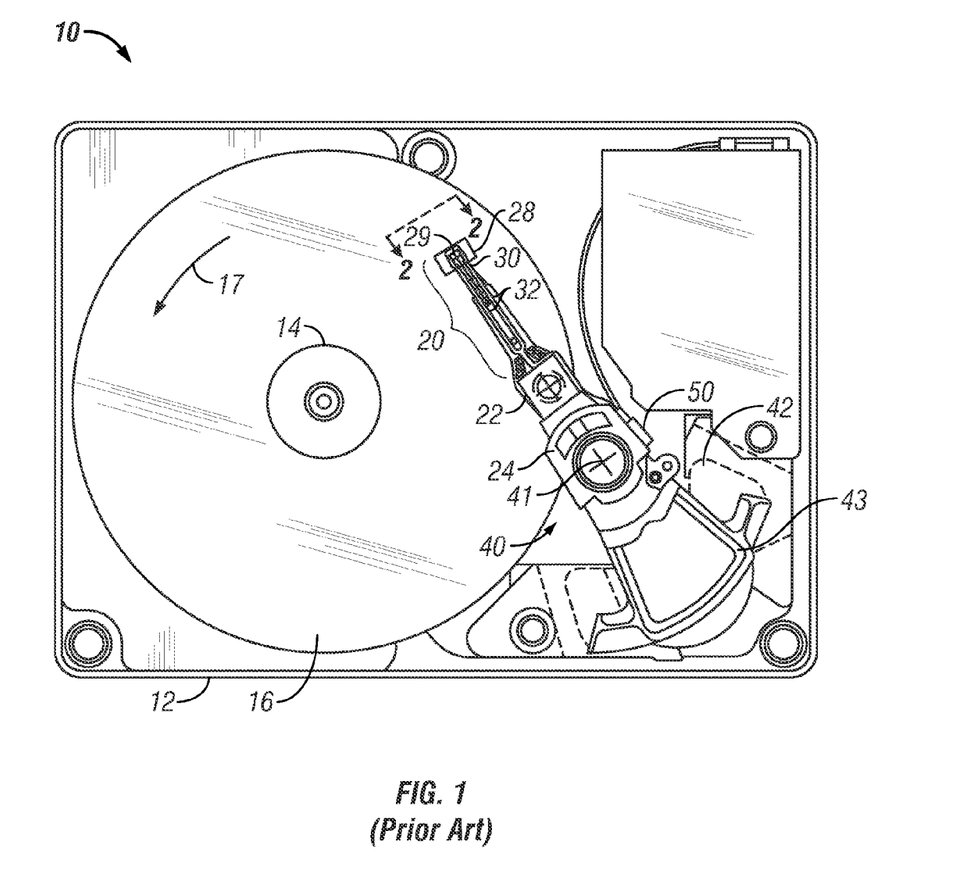
FIG. 1 is a top plan view of a head/disk assembly of a hard disk drive.

FIG. 1 is a top plan view of a head/disk assembly of a hard disk drive 10 like that for use with the present invention with the cover removed. The disk drive 10 includes a rigid base 12 supporting a spindle 14 that supports a stack of disks, including top disk 16. The spindle 14 is rotated by a spindle motor (not shown) for rotating the disks in the direction shown by curved arrow 17. The hard disk drive 10 has at least one load beam assembly 20 having an integrated lead suspension (ILS) or flexure 30 with an array 32 of electrically conductive interconnect traces or lines. The load beam assemblies 20 are attached to rigid arms 22 connected to an E-shaped support structure, sometimes called an E-block 24. Each flexure 30 is attached to a head carrier, for example an air-bearing slider 28. A magnetic recording read/write head 29 is located at the end or trailing surface 25 of slider 28. The flexure 30 enables the slider 28 to "pitch" and "roll" on an air-bearing generated by the rotating disk 16. Disk drive 10 also includes a rotary actuator assembly 40 rotationally mounted to the rigid base 12 at a pivot point 41. The actuator assembly 40 is a voice coil motor (VCM) actuator that includes a magnet assembly 42 fixed to base 12 and a voice coil 43. When energized by control circuitry (not shown) the voice coil 43 moves and thereby rotates E-block 24 with attached arms 22 and load beam assemblies 20 to position the read/write heads 29 to the data tracks on the disks. The trace interconnect array 32 connects at one end to the read/write head 29 and at its other end to read/write circuitry contained in an electrical module or chip 50 secured to a side of the E-block 24. The chip 50 includes a read preamplifier and a write driver circuit.

Figure 2:
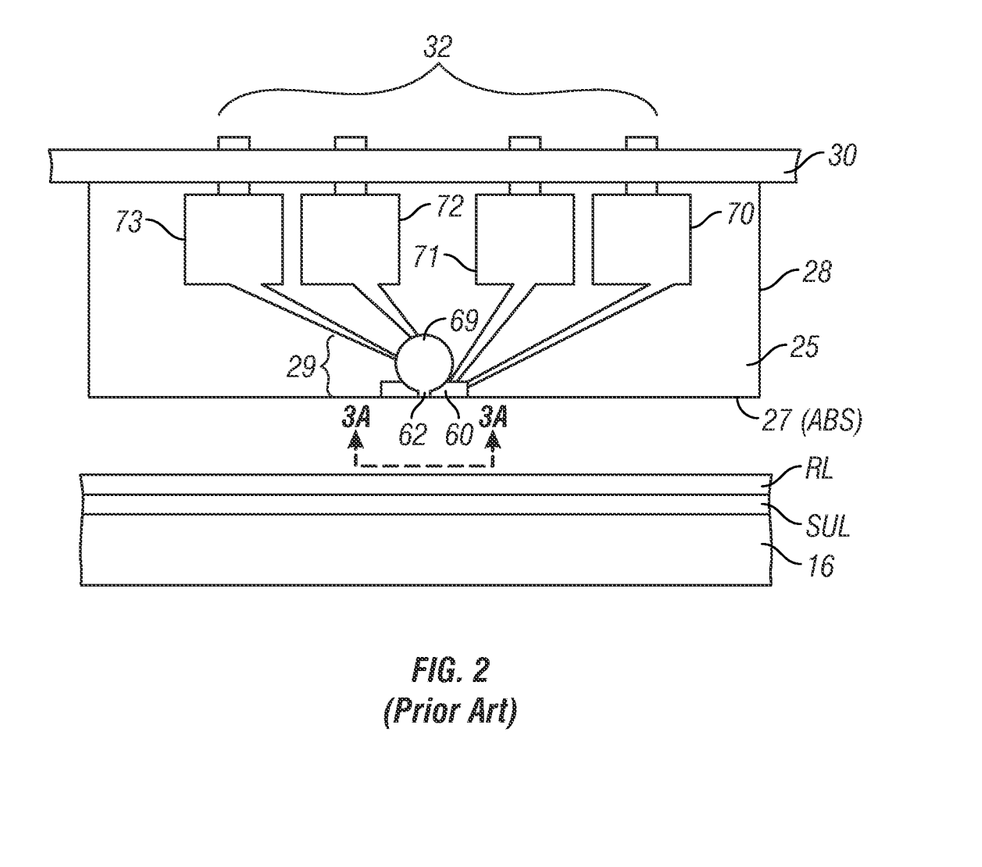
FIG. 2 is an enlarged end view of the slider and a section of the disk taken in the direction 2-2 in FIG. 1.

FIG. 2 is an enlarged end view of the slider 28 and a section of the disk 16 taken in the direction 2-2 in FIG. 1. The disk 16 includes a perpendicular magnetic data recording layer (RL) on a "soft" or relatively low-coercivity magnetically permeable underlayer (SUL) formed on the disk substrate. The slider 28 is attached to flexure 30 and has an air-bearing surface (ABS) 27 facing the RL on disk 16 and an end or trailing surface 25 generally perpendicular to the ABS 27. The ABS 27 causes the airflow from the rotating disk 16 to generate a bearing of air that supports the slider 28 in very close proximity to or near contact with the surface of disk 16. The read/write head 29 is formed as a series of thin films deposited on the slider 28 on its trailing surface 25. Typically a layer of insulating material, like alumina, is deposited over the read/write head 29 and serves as the outer surface of slider 28. The read/write head 29 includes a thin film read head 60, typically a magnetoresistive read head, and write head 62 that includes an electrically conductive coil 63. The read head 60 is connected to terminal pads 70, 71 on the trailing surface 25 of slider 28, and the coil 69 of write head 62 is connected to terminal pads 72, 73 on the trailing surface 25 of slider 28. The terminal pads 70, 71 and 72, 73 connect to the trace array 32 on flexure 30 for electrical connection to the read preamplifier and write driver in chip 50 (FIG. 1).

Figure 3A:
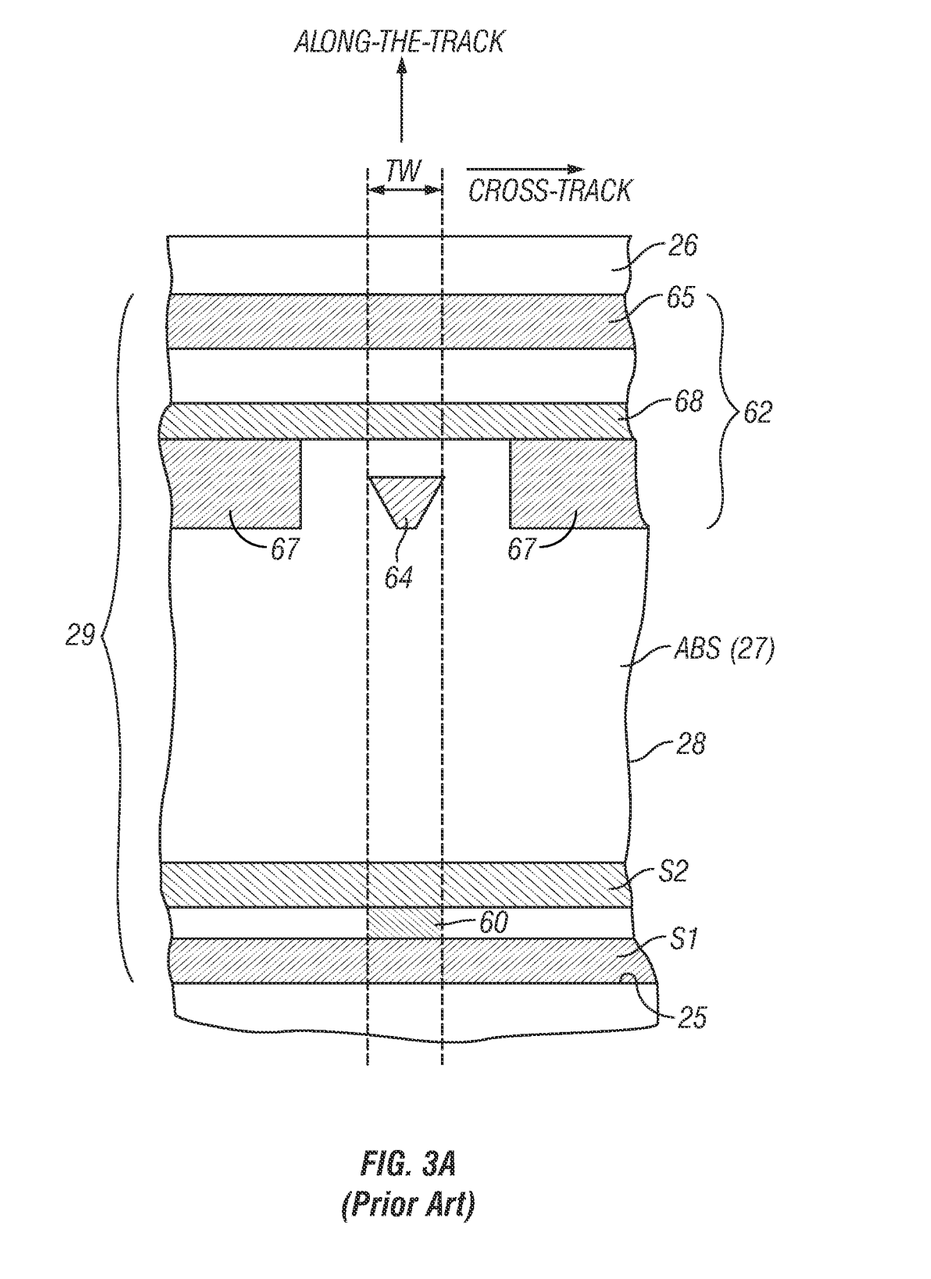
FIG. 3A is a view in the direction 3A-3A of FIG. 2 and shows the ends of the read/write head as viewed from the disk.

FIG. 3A is a view in the direction 3A-3A of FIG. 2 and shows the ends of read/write head 29 as viewed from the disk 16. The read/write head 29 includes a read head 60 with shields S1, S2 and a write head 62 that are formed as a series of thin films deposited and lithographically patterned on the trailing surface 25 of slider 28, with the films of the read head and shields being deposited first and the films of the write head being deposited over the read head and shields. The series of thin films are deposited and lithographically patterned using thin-film deposition and patterning techniques well-known in the art of thin-film magnetic recording head fabrication. The write head 62 includes a perpendicular magnetic write pole WP 64 and may also include a trailing shield 68 and/or side shields 67. The read head 60 is located between two magnetic shields S1 and S2, with first shield S1 being located on trailing surface 25. The shields S1, S2 are formed of magnetically permeable material like NiFe and are electrically conductive so they can also function as the electrical leads to the read head 60. Separate electrical leads may also be used, in which case the read head 60 is formed in contact with layers of electrically conducting lead material, such as tantalum, gold, or copper, that are in contact with the shields S1, S2.

The write head 62 has a perpendicular write head and includes magnetic write pole WP 64 and flux return pole 65. The tip of WP 64 may be generally surrounded at the ABS by optional side shields 67 and trailing shield 68. The trailing shield 68 and side shields 67 may be connected to form a wraparound shield (WAS). The WAS is described in detail as a shield for a conventional perpendicular recording head in U.S. Pat. No. 7,002,775 B2 assigned to the same assignee as this application. The WAS, which is separated from the tip of WP 64 by nonmagnetic gap material, alters the angle of the write field and improves the write field gradient at the point of writing, and also shields the writing field at regions of the disk away from the track being written. The shields S1, S2 for the read head 60 and the shields 67, 68 for the tip of WP 64 are formed of magnetically permeable material. A layer of insulating material, like alumina ($Al_2O_3$), is deposited over the write head 60, resulting in an outer surface 26. The width of the tip of WP 64 and the read head 60 in the cross-track direction correspond generally to the trackwidth (TW) of the data tracks on the disk 16.

Figure 3B:
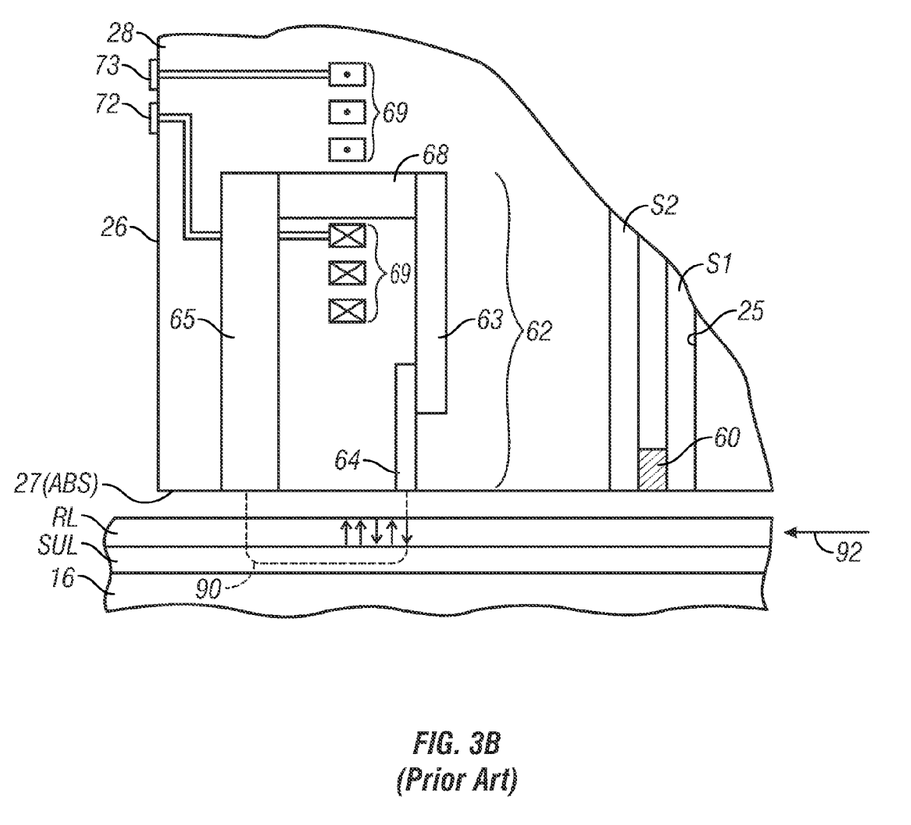
FIG. 3B is a sectional view of a portion of a slider showing a prior art perpendicular write head with a pancake coil and a portion of a perpendicular magnetic recording disk.

FIG. 3B is a sectional view of a portion of slider 28 showing the perpendicular write head 62 and a portion of the perpendicular magnetic recording disk 16. The write head 62 includes a yoke made up of the main pole 63, flux return pole 65, and yoke stud 68 connecting the main pole 63 and flux return pole 65, and a thin film "pancake" coil 69 shown as sections wrapped around yoke stud 68. The return pole 65 and yoke stud 68 are formed of soft ferromagnetic material, such as alloys of NiFe, CoFe and NiFeCo that are typically formed by electroplating. The write head 62 in FIG. 3B is depicted without the optional WAS (FIG. 3A). The coil 69 is connected to terminals 72, 73 (FIG. 2), on the outer surface 26 of slider 28. The write pole (WP) 64 is part of the main pole 63 and has a pole tip that faces the surface of disk 16. The WP 64 is formed of a high-moment material, such as a high-moment CoFe alloy, that is typically formed by sputter deposition, and may be a laminated structure. Write current through the thin film coil 69 induces a magnetic field (shown by dashed line 90) from the WP 64 that passes through the RL (to magnetize the region of the RL beneath the WP 64), through the flux return path provided by the SUL, and back to the return pole 65. The slider 28 has its air-bearing surface (ABS) 27 supported above the surface of disk 16 as the disk 16 moves past the write head 62 in the direction indicated by the arrow 92. The RL is illustrated with a perpendicularly recorded or magnetized region representing data adjacent to the pole tip 64. Preceding regions are shown having random prerecorded magnetization directions, as represented by the arrows in the RL. The magnetic transitions are detectable by the read head 60, located between the two magnetic shields S1, S2, as the recorded bits. The write coil 69 is called a "pancake" coil because it is deposited and patterned on the trailing end of the slider as essentially a single layer and thus all of the coil turns lie in substantially the same plane. When write current from the write driver in chip 50 (FIG. 1) is directed to coil 69 in one direction, for example in FIG. 3B out of the paper in the upper coil sections 69 with dots and into the paper in the lower coil sections 69 with the Xs, the region of the RL beneath the tip of WP 64 is magnetized in one direction, down or into the disk in FIG. 3B. When the write driver switches the direction of the write current to coil 69, the region of the RL beneath the tip of WP 64 is magnetized in the opposite direction, i.e., up or out of the disk in FIG. 3B.

In this invention ladder network compensation circuitry is located on the slider body for increasing the overshoot of the write current at the time of current switching. This increases the speed of magnetization reversal of the write pole. The ladder network compensation circuitry includes capacitors and inductors fabricated on the slider body, for example on the trailing surface of the slider adjacent the write head. U.S. Pat. No. 6,603,623 B1 shows a resistor and capacitor network on the trailing surface of a slider and placed in parallel with the write head for changing the intrinsic termination impedance of the write head so that it matches the characteristic impedance of the transmission line delivering the write current. U.S. Pat. No. 7,545,608 B2 shows resistors and capacitors on the trailing surface of a slider for balancing the parasitic capacitance of the magnetoresistive read head.

Figure 4:
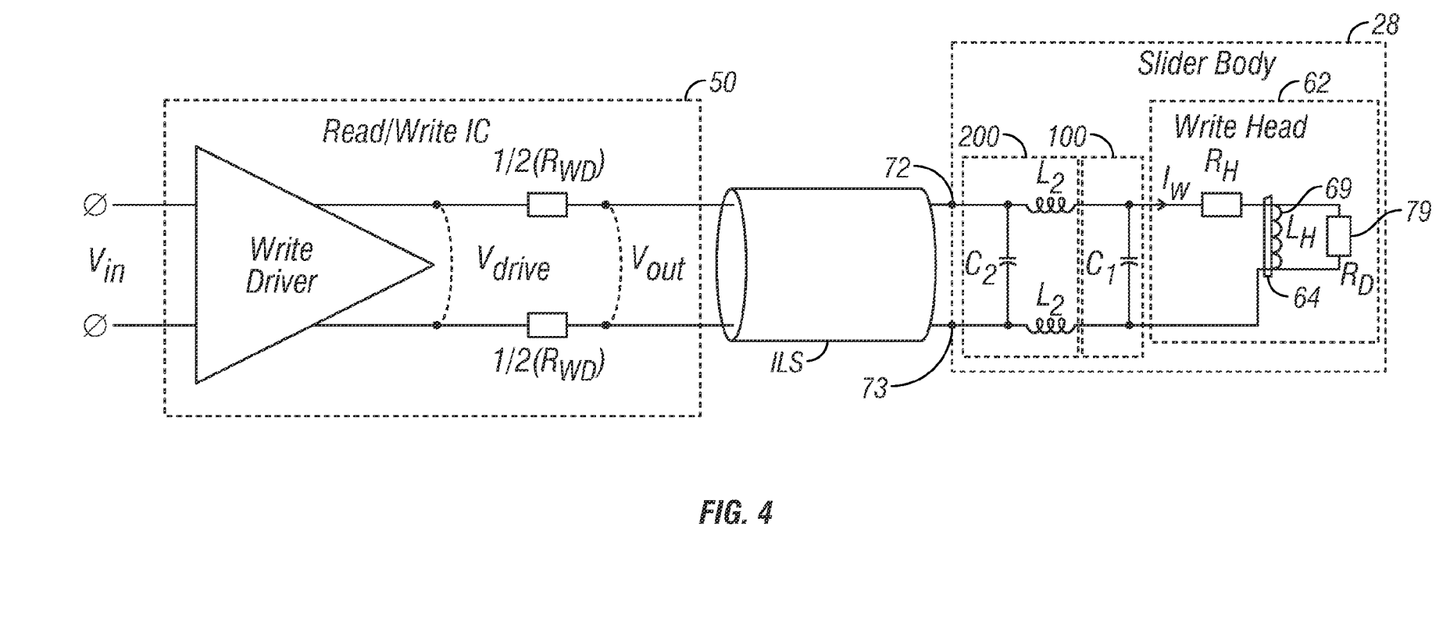
FIG. 4 shows the ladder network compensation circuitry located between the write driver and the write head.

FIG. 4 shows the electrical enhancement circuitry in the form of a first ladder network block 100 and second ladder network block 200 located between the write head terminals 72, 73 on slider 28. The write head 62 is shown as having a resistance $R_H$ and a coil 69 with inductance $L_H$. The write head 62 also has inherent damping ($R_D$) from the physical construction of the head, as represented by resistor 79. The write driver circuitry is in the read/write integrated circuit of chip 50 (FIG. 1) that is located away from the slider, typically on the E-block 24 (FIG. 1). The write driver operates at a voltage $V_{drive}$ and has a resistance $R_{WD}$, represented by two resistors, each with resistance $R_{WD}/2$. The write driver is connected via interconnect lines on the integrated lead suspension (ILS) to the write coil 69 of write head 62 via terminals 72, 73. To write data the write current $I_W$ switches direction to reverse the magnetization of the write pole 64.

The first ladder network block 100 is capacitor C1 located in parallel between terminals 72, 73 with a first end connected to terminal 72 and a second end connected to terminal 73. The second ladder network block 200 includes a second capacitor C2, also with a first end connected to terminal 72 and a second end connected to terminal 73, and two inductors located between the respective capacitor ends, with the inductors having substantially the same inductance L2. The compensation circuitry is referred to as a ladder network because additional ladder blocks, like block 200, but with different values of capacitance and inductance, may be located between terminals 72, 73 and block 200. A slider with electrical enhancement circuitry consisting of just block 100, without the additional block 200, is described in pending application Ser. No. 12/615,087 filed Nov. 9, 2009 and assigned to the same assignee as this application. However, in the present invention, the additional ladder blocks provide greater current overshoot and even faster magnetization reversal, and also address the problem of "damping" in the write coil 69.

The electrical response of a typical write head has inherent damping ($R_D$) from the physical construction, as represented by resistor 79 in FIG. 4. If $R_D$ is suboptimum, an additional resistor can be constructed to add additional damping, which is an additional parallel resistor across the write head element. The $R_D$ value then creates the termination for the transmission line (ILS). Once the $R_D$ termination is known or set by adding a parallel resistor, the optimum LC ladder network is then set by utilizing the characteristic impedance equation $Z_0$.

$$Z_0 = \sqrt{\frac{L_n}{C_n}} \qquad \text{Equation (1)}$$

The first inductance value is set by the inherent coil inductance 69 from the write head ($L_H$), and the C1 capacitor is determined by the $R_D$ value, where $R_D$ is used in place of $Z_0$ in Equation (1). In addition, Equation (1) essentially determines the ratio of the $L_n$ and $C_n$, and this ratio can be modified to the desired frequency and/or time domain response by including a k factor. The k factor alters ratio of the $L_n$ and $C_n$. Substituting $L_H$, $R_D$, and including the k factor forms Equation (2), which then can be used to determine C1.

$$R_D = \sqrt{\frac{kL_H}{C_1}} \qquad \text{Equation (2)}$$

Depending on the desired write signal wave shape, the k factor can be set and/or optimized. For example, a k factor of 1 sets a fixed bandwidth with more peaking, where k factors <1 increase the frequency bandwidth. Typical values of the k factor, coil inductance, and $R_D$ are: 0.5, 0.5 nH, and 11.2Ω, respectively. Using Equation (2), C1 would then be 2 pF, To continue the LC ladder, the total inductance of the L2 pair (ladder network block 200) is then equated to the inherent coil inductance, where $L2 = L_H/2$ and is distributed in two portions. The LC ladder then continues with the same $L_n$ and $C_n$ ratio, so the next capacitor, C2, is the same value as C1 (2 pF). The effect of setting up the LC ladder network allows for improved high-frequency termination and increased overshoot in the time domain.

Figure 5:
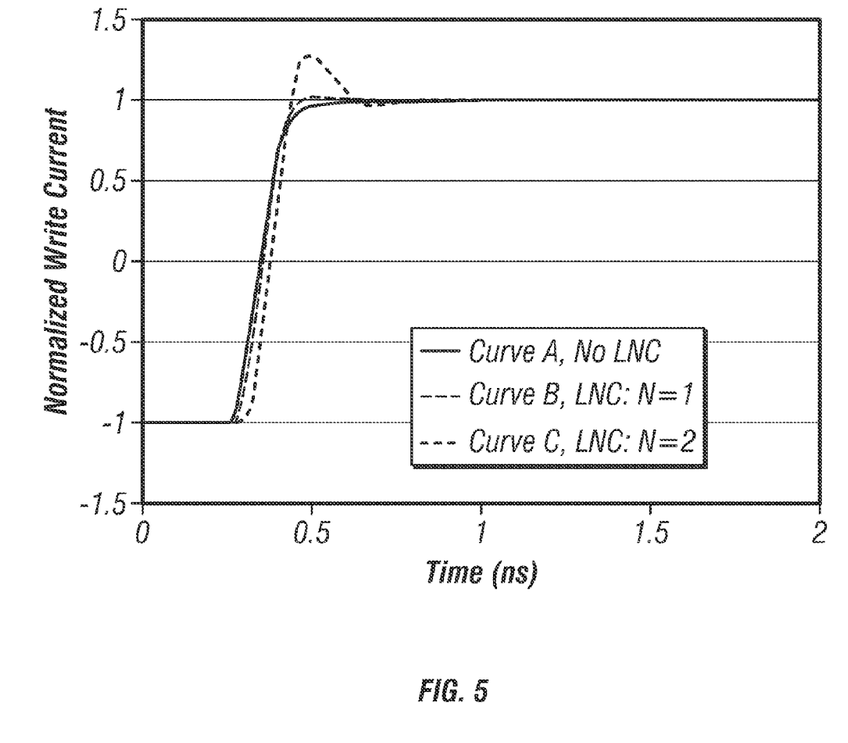
FIG. 5 is a graph of the time domain response for the write current $I_W$ when there is no ladder network compensation circuitry (Curve A), when there is a first ladder network block with capacitor C1 (Curve B), and when there is both the first ladder network block and a second ladder network block with capacitor C2 and first and second inductors each with inductance L2 (Curve C).

FIG. 5 shows the time domain response for $I_W$. Curve A is for the case where there is no ladder network compensation (LNC) circuitry. Curve B is for the case where there is just ladder network block 100 with capacitor C1 with capacitance 2 pF. Curve C is for the case where there is both the ladder network block 100 and the ladder network block 200 with capacitor C2 with capacitance 2 pF and first and second inductors each with inductance L2 of 0.5 nH (2×0.25 nH). Curve C shows about a 28% inherent overshoot over Curve A, where Curve B shows only a 2% inherent overshoot over Curve A. The system response with overshoot Curve C is desirable to assist with the magnetization reversal in the write pole. If a third network block like block 200 were to be located between terminals 72, 73 and block 200, and with appropriately selected values for capacitance C3 and inductance L3, then an even greater amount of overshoot could be achieved.

Figure 6A:
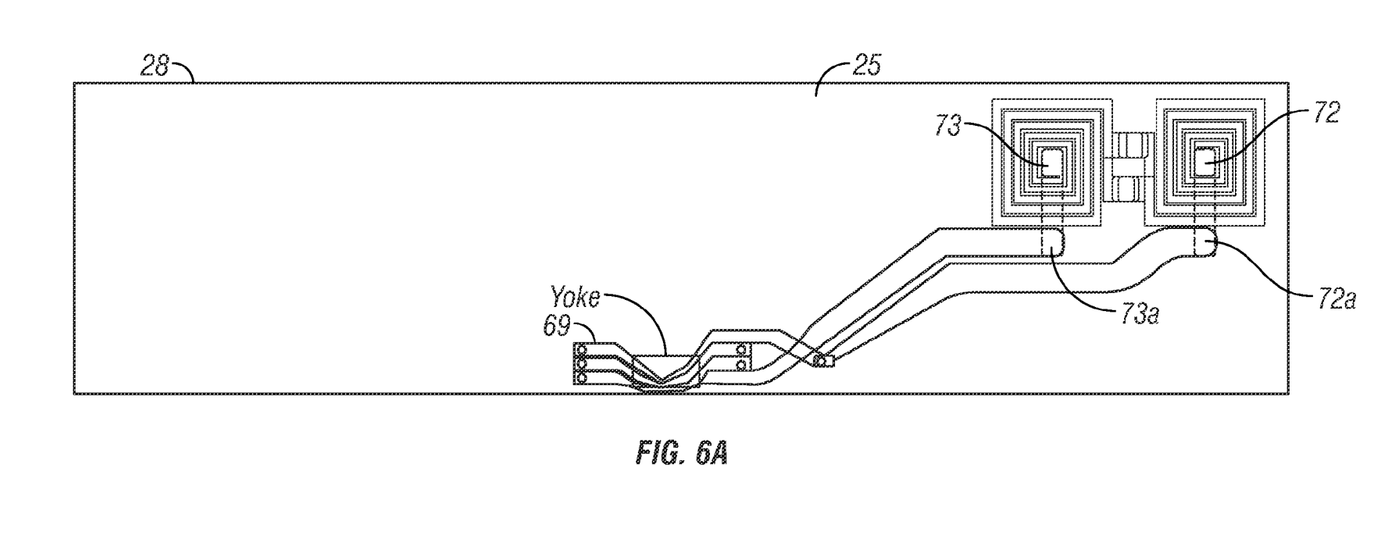
FIG. 6A is a view of the slider showing the write coil and connection of the ladder network compensation circuitry on the trailing surface of the slider.
Figure 6B:
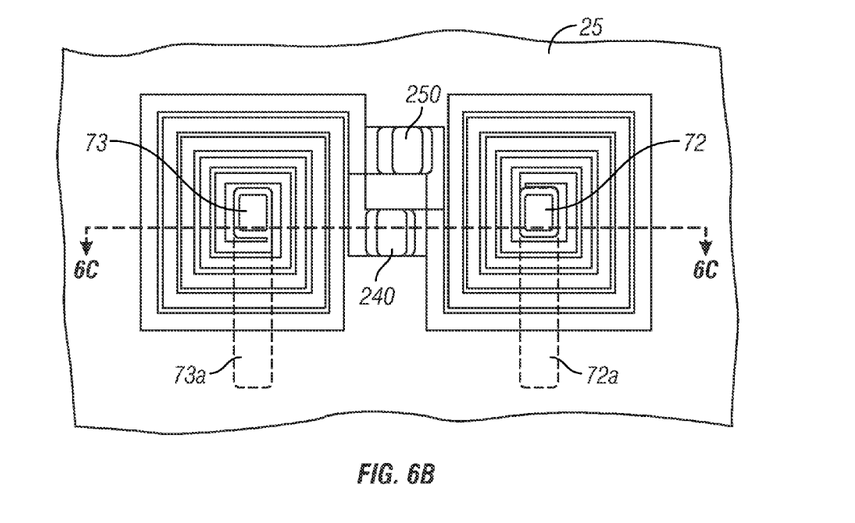
FIG. 6B is an enlarged view of the discrete components making up the ladder network compensation circuitry.
Figure 6C:
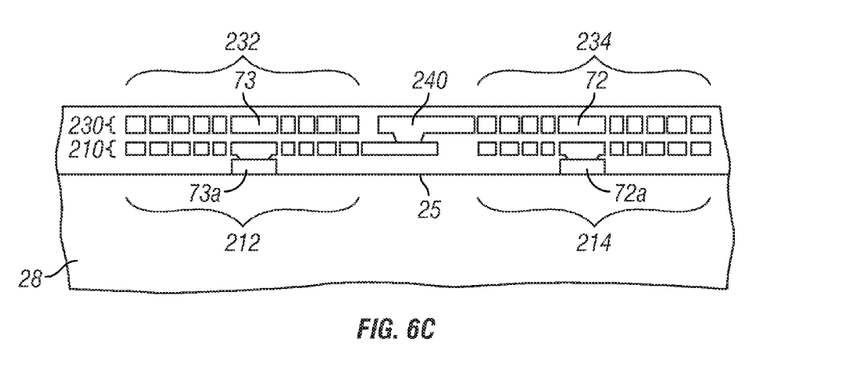
FIG. 6C is a sectional view of the two sides of the network compensation circuitry in FIG. 6B showing the various layers making up the discrete capacitors and inductors.

FIGS. 6A-6C illustrate one way in which the discrete components can be fabricated on the trailing surface of a slider. FIG. 6A is a view of the trailing surface 25 of the slider 28 showing the write coil 69, top terminals 72, 73 that connect to the ILS, bottom terminals 72A and 73A that connect to the write coil 69, and portions of the discrete components making up the ladder network compensation circuitry. FIG. 6B is an enlarged view of the discrete components making up the ladder network compensation circuitry and FIG. 6C is a sectional view of the two sides of the network compensation circuitry in FIG. 6B showing the various layers making up the discrete capacitors and inductors. There are two spaced-apart coil sections 212, 214 in a lower layer 210, and two spaced-apart coil sections 232, 234 in an upper layer 230. Each L2 inductor is made up of an upper coil section on one side and a lower coil section on the opposite side that are connected by vias 240, 250. Thus one L2 inductor is coil section 234 and coil section 212 electrically connected by via 240. Similarly, the other L2 inductor is coil section 232 and coil section 214 electrically connected by via 250. Current flows into upper terminal 72, then clockwise around upper coil section 234, then through via 240, then counterclockwise around lower coil section 212, then to bottom terminal 73a to the write coil. Current returns from the write coil at bottom terminal 72A, then clockwise around lower coil section 214, then through via 250, then counterclockwise around upper coil section 232, then to upper terminal 73.

Figure 7A:
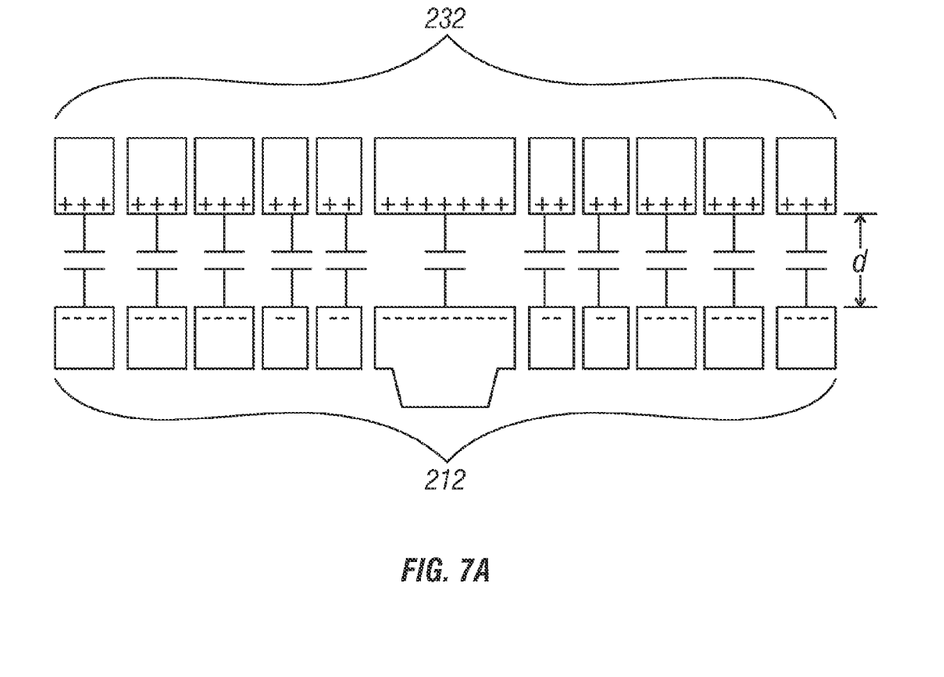
FIG. 7A is a sectional view of portions of upper and lower coil sections illustrating how the capacitance is distributed across the inductors.
Figure 7B:
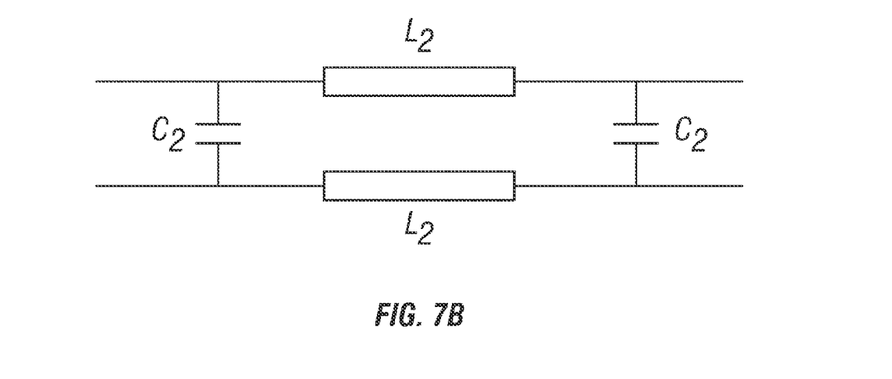
FIG. 7B illustrates a circuit that approximates the distributed capacitance shown in FIG. 7A.

FIG. 7A shows a portion of upper coil section 232 and lower coil section 212 for illustrating that the capacitance C2 is distributed across each of the two L2 inductors. Upper coil section 232 and lower coil section 212 are spaced apart by a dielectric gap layer having a spacing d. While the capacitance is distributed across the inductors, it can be approximated as two capacitors C2 connecting both sides of the inductors, as depicted by FIG. 7B. The capacitance is given by $$C2 = (\in pA)/d \qquad \text{Equation (3)}$$

where A is the area of one coil section, p is the copper fraction of the coil section, d, is the spacing between the coils sections and $\in$ is the dielectric constant of the spacing.

Capacitor C1 making up ladder block 100 is not depicted in FIGS. 6A-6B. However, to fabricate capacitor C1, metal from lower layer 210 can be fabricated away from the inductor region 212 and overlapped with a portion of metal layer 230 separated by the same gap, d, as used in the inductors. The target capacitance value for C1 is achieved through Equation (3) with the value pA replaced with the overlap area of the two additional pieces. The top plate for capacitor C1 is connected to terminal 73A and the bottom plate for capacitor C1 is connected to terminal 72A, or vice-versa.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A head carrier for a magnetic recording disk drive read/write head comprising:
    first and second electrically conductive terminals on the head carrier;
    a write head comprising an electrically conductive write coil on the head carrier;
    first ladder network compensation circuitry on the head carrier connected between the write coil and the first and second terminals and consisting of a first capacitor C1 having a first end connected to one end of the write coil and a second end connected to the other end of the write coil; and
    second ladder network compensation circuitry on the head carrier connected between the first ladder network compensation circuitry and the first and second terminals and comprising a second capacitor C2 having a first end connected to the first terminal and a second end connected to the second terminal, a first inductor connected between the first ends of C1 and C2, and a second inductor connected between the second ends of C1 and C2, wherein the first and second inductors have substantially the same inductance L2.

2. The head carrier of claim 1 wherein the first and second terminals are adapted for connection to a write driver for supplying an alternating write current to the write coil, wherein the write coil generates a first current level at current reversal in the absence of said first and second ladder network compensation circuitries, and a second current level at current reversal greater than said first current level in the presence of said both said first and second ladder network compensation circuitries.

3. The head carrier of claim 1 further comprising a third ladder network compensation circuitry on the head carrier connected between the second ladder network compensation circuitry and the first and second terminals and comprising a third capacitor C3 having a first end connected to the first terminal and a second end connected to the second terminal, a first inductor connected between the first ends of C2 and C3, and a second inductor connected between the second ends of C2 and C3, wherein the first and second inductors have substantially the same inductance L3.

4. The head carrier of claim 1 wherein the write coil has an inductance $L_H$, a resistance $R_H$, and a damping resistance $R_D$, and wherein $R_D$ is substantially equal to the square root of $kL_H/C1$, where k is a factor greater than 0 and less than or equal to 1.

5. The head carrier of claim 1 wherein the write coil has an inductance $L_H$, a resistance $R_H$, and a damping resistance $R_D$, and wherein L2 is substantially equal to $L_H/2$.

6. The head carrier of claim 1 wherein the head carrier has a substantially planar trailing surface and further comprising first and second spaced-apart lower coil sections on said trailing surface, a first upper coil section on said first lower coil section and a second upper coil section on said second lower coil section, and wherein said first inductor comprises said first lower coil section connected to said second upper coil section and said second inductor comprises said second lower coil section connected to said first upper coil section.

7. The head carrier of claim 6 wherein the lower coil sections and upper coil sections are spaced apart by an insulating gap layer, and wherein the capacitance for capacitor C2 is distributed across said upper and lower coil sections and gap layer.

8. A head carrier for a magnetic recording disk drive read/write head comprising:
    first and second electrically conductive terminals on the head carrier;
    a write head comprising an electrically conductive write coil on the head carrier;
    first ladder network compensation circuitry on the head carrier connected between the write coil and the first and second terminals and consisting of a first capacitor C1 having a first end connected to one end of the write coil and a second end connected to the other end of the write coil; and
    second ladder network compensation circuitry on the head carrier connected between the first ladder network compensation circuitry and the first and second terminals and comprising a first inductor between the first terminal and the first end of capacitance C1 and a second inductor between the second terminal and the second end of C1 with both inductors having the substantially the same inductance L2, the second ladder compensation circuitry having a distributed capacitance C2 between the first and second inductors.

9. An air-bearing slider for a magnetic recording disk drive, the slider having a trailing surface, the slider comprising:
    first and second electrically conductive terminals on a head carrier;
    a write head comprising an electrically conductive write coil on the trailing surface;
    a first ladder network compensation circuitry on the trailing surface electrically connected in parallel with the write coil and consisting of a first capacitor C1; and
    a second ladder network compensation circuitry on the trailing surface electrically connected between the first ladder network compensation circuitry and the first and second terminals and comprising a second capacitor C2 and first and second inductors having substantially the same inductance L2.

10. The slider of claim 9 wherein capacitor C2 has a first end connected to the first terminal and a second end connected to the second terminal, wherein said first inductor is connected between the first ends of C1 and C2, and said second inductor is connected between the second ends of C1 and C2.

11. The slider of claim 9 further comprising a third ladder network compensation circuitry on the trailing surface electrically connected between the second ladder network compensation circuitry and the first and second terminals and comprising a third capacitor C3 and first and second inductors having substantially the same inductance L3.

12. The slider of claim 9 wherein the write coil has an inductance $L_H$, a resistance $R_H$, and a damping resistance $R_D$, and wherein $R_D$ is substantially equal to the square root of $kL_H/C1$, where k is a factor greater than 0 and less than or equal to 1.

13. The slider of claim 9 wherein the write coil has an inductance $L_H$, a resistance $R_H$, and a damping resistance $R_D$, and wherein L2 is substantially equal to $L_H/2$.

14. The slider of claim 9 wherein the capacitance of C1 is substantially equal to the capacitance of C2.

15. The slider of claim 9 further comprising first and second spaced-apart lower coil sections on said trailing surface, a first upper coil section on said first lower coil section and a second upper coil section on said second lower coil section, and wherein said first inductor comprises said first lower coil section connected to said second upper coil section and said second inductor comprises said second lower coil section connected to said first upper coil section.

16. The slider of claim 15 wherein the lower coil sections and upper coil sections are spaced apart by an insulating gap layer, and wherein the capacitance for capacitor C2 is distributed across said upper and lower coil sections and gap layer.

* * * * *